United States Patent
Ichii et al.

(10) Patent No.: US 8,310,558 B2
(45) Date of Patent: Nov. 13, 2012

(54) IMAGING APPARATUS HAVING A RECORDING FUNCTION OF A STILL IMAGE AND A MOVING IMAGE AND DISPLAYING A THROUGH IMAGE

(75) Inventors: Nobuhiko Ichii, Hirakata (JP); Ryo Sakaji, Izumisano (JP); Yurie Sakai, Osaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 575 days.

(21) Appl. No.: 12/475,937

(22) Filed: Jun. 1, 2009

(65) Prior Publication Data

US 2009/0295932 A1 Dec. 3, 2009

(30) Foreign Application Priority Data

Jun. 2, 2008 (JP) ................... 2008-145199

(51) Int. Cl.
*H04N 5/225* (2006.01)
*H04N 5/222* (2006.01)

(52) U.S. Cl. ................. 348/220.1; 348/333.11

(58) Field of Classification Search .............. None
See application file for complete search history.

(56) References Cited

U.S. PATENT DOCUMENTS

| | | | | |
|---|---|---|---|---|
| 5,734,424 A | * | 3/1998 | Sasaki | 348/222.1 |
| 5,923,816 A | * | 7/1999 | Ueda | 386/230 |
| 7,369,683 B2 | * | 5/2008 | Kobayashi et al. | 382/107 |
| 7,489,343 B2 | * | 2/2009 | Yokonuma | 348/220.1 |
| 7,808,530 B2 | * | 10/2010 | Saitou | 348/220.1 |

FOREIGN PATENT DOCUMENTS

| | | | |
|---|---|---|---|
| JP | 2003-259161 | * | 9/2003 |
| JP | 2006-033263 | A | 2/2006 |
| JP | 2006-148273 | A | 6/2006 |
| JP | 2006-180152 | * | 7/2006 |

OTHER PUBLICATIONS

Japanese Office Action issued May 15, 2012 in application No. JP2008-145199.
Chinese Office Action issued Jul. 5, 2012 in corresponding Chinese application No. 200910203132.3.

* cited by examiner

*Primary Examiner* — Luong T Nguyen
(74) *Attorney, Agent, or Firm* — NDQ&M Watchstone LLP (57) ABSTRACT

An imaging apparatus fetches an optical image of an object so as to produce an image signal, records on a recording medium an image signal corresponding to a still-image-use image size according to a still-image recording instruction, records on the recording medium an image signal corresponding to a moving-image-use image size according to a moving-image recording instruction, repeatedly creates the image signal and causes a displayer to display a still-image-use through image corresponding to the still-image-use image size, repeatedly creates the image signal and causes the displayer to display a moving-image-use through image corresponding to the moving-image-use image size, switches the still-image-use through image and the moving-image-use through image, and accepts the still-image recording instruction or the moving-image recording instruction when the still-image-use through image or the moving-image-use through image is displayed.

4 Claims, 10 Drawing Sheets

(k) MOVING IMAGE 16:9

(l) MOVING IMAGE 4:3

(m) STILL IMAGE 4:3

(n) STILL IMAGE 16:9

IMAGING APPARATUS HAVING A RECORDING FUNCTION OF A STILL IMAGE AND A MOVING IMAGE AND DISPLAYING A THROUGH IMAGE

CROSS REFERENCE OF RELATED APPLICATION

The disclosure of Japanese Patent Application No. 2008-145199, which was filed on Jun. 2, 2008 is incorporated herein by reference.

BACKGROUND OF THE INVASION

1. Field of the Invention

The present invention relates to an imaging apparatus. In particular, the present invention relates to an imaging apparatus, having a recording function of recording a still image and a moving image, for displaying a through image on a display device, for example, the imaging apparatus being for controlling display onto the display device on the through image of an imaging area according to image sizes of a still image and a moving image set by a user.

2. Description of the Related Art

In the recent years, there is commercialized a video camera having a function capable of not only imaging and recording a still image but also imaging and recording a moving image over a long period of time. It is possible not only to reproduce and display the shot moving image on a monitor provided in the video camera but also to reproduce and display that image by a television receiver of a fixed-pixel system such as a liquid crystal display or of a cathode ray tube system or the like, which is connected to the video camera Then, in the recent years, a television receiver capable of displaying a high-vision image (HD: High Definition) is widely used, and in response thereto, there is commercialized a video camera capable of imaging and recording not only an SD (Standard Definition) image, which is called a standard image quality, but also the high-vision image.

To change a subject slightly, an aspect ratio of the high-vision image generally is 16:9 while that of the SD image is 4:3. Therefore, a video camera having a function as an electronic view finder for displaying on a monitor images (through images) which are for confirming an object image to be imaged and which are sequentially outputted from an imaging element (in this way, it becomes necessary to take a look over a finder during imaging) includes many products so designed that both an image having the aspect ratio of 16:9 and that having the aspect ratio of 4:3 are displayable.

Moreover; in the conventional video camera, through images to be displayed on a monitor while waiting for imaging may include a moving image having an aspect ratio of 16:9 and a still image having an aspect ratio of 4:3. In this case, imaging modes are switched by a power supply switch, a mode change-over switch, etc., to switch between the through image having the aspect ratio of 16:9 and that having the aspect-ratio of 4:3. However such a mode change-over process requires complicated operations by the user, and thus, it takes a long period of time.

In a certain conventional imaging apparatus, in order to alleviate the complicated operations by the user or to immediately determine a recording image region according to switching of the images photographed by the user, a guide frame is added according to whether image data to be recorded is the moving image or the still image, or according to a recording state, i.e., whether a parallel image recording (both the moving image and the still image) is performed, and the guide frame is dynamically switched and displayed.

However, in the above-described imaging apparatus, as a through image, a still-image-compatible guide frame and a moving-image-compatible guide frame are merely displayed in a photographing-image displaying region. Even when a user wishes to shoot the still image, the through image displayed on the monitor is not a still-image-use through image in an imaging area corresponding to an image size that is actually recorded. Likewise, even when the user wishes to shoot the moving image, the through image displayed on the monitor is not a moving-image-use through image in an imaging area corresponding to an image size that is actually recorded.

That is, in the above-described imaging apparatus, even when the user refers to the through image that is displayed on the monitor and that waits for imaging so as to perform still-image shooting or moving-image shooting, the still-image-use guide frame and the moving-image-use guide frame are displayed all the time. Thus, the user is not able to intuitively recognize the imaging area to be imaged, and is not necessarily able to see a through image that is said to be easy to see.

SUMMARY OF THE INVENTION

An imaging apparatus according to the present invention, comprises: an imager for fetching an optical image of an object so as to produce an image signal; a still-image recorder for recording on a recording medium an imaging signal corresponding to a still-image-use image size according to a still-image recording instruction; a moving-image recorder for recording on the recording medium an imaging signal corresponding to a moving-image-use image size according to a moving-image recording instruction; a still-image-use through image displayer so configured that the imaging signal is repeatedly created by the imager and a still-image-use through image corresponding to the still-image-use image size is displayed on a displayer; a moving-image-use through image displayer so configured that the imaging signal is repeatedly created by the imager and a moving-image-use through image corresponding to the moving-image-use image size is displayed on the displayer; a through image switcher for switching the still-image-use through image and the moving-image-use through image; and an acceptor for accepting the still-image recording instruction or the moving-image recording instruction when the still-image-use through image or the moving-image-use through image is displayed.

Preferably, further comprised is a superposer for superposing a framework indicating the moving-image-use image size on the still-image-use through image when the still-image-use through image is displayed on displayer in still-image-use through image displayer.

More preferably further comprised are: a still-image aspect-ratio setter for setting an aspect ratio of the still image; and a moving-image aspect-ratio setter for setting an aspect ratio of the moving image, wherein superposer superposes a framework based on the still-image aspect ratio and the moving-image aspect ratio onto the still-image-use through image.

The above described features and advantages of the present invention will become more apparent from the following detailed description of the embodiment when taken in conjunction with the accompanying drawings.

DETAILED DESCRIPTION OF THE PREFERRED EMBODIMENTS

In this embodiment, as one example of an imaging apparatus, a mode of an electronic camera 10 is described.

Figure 1:
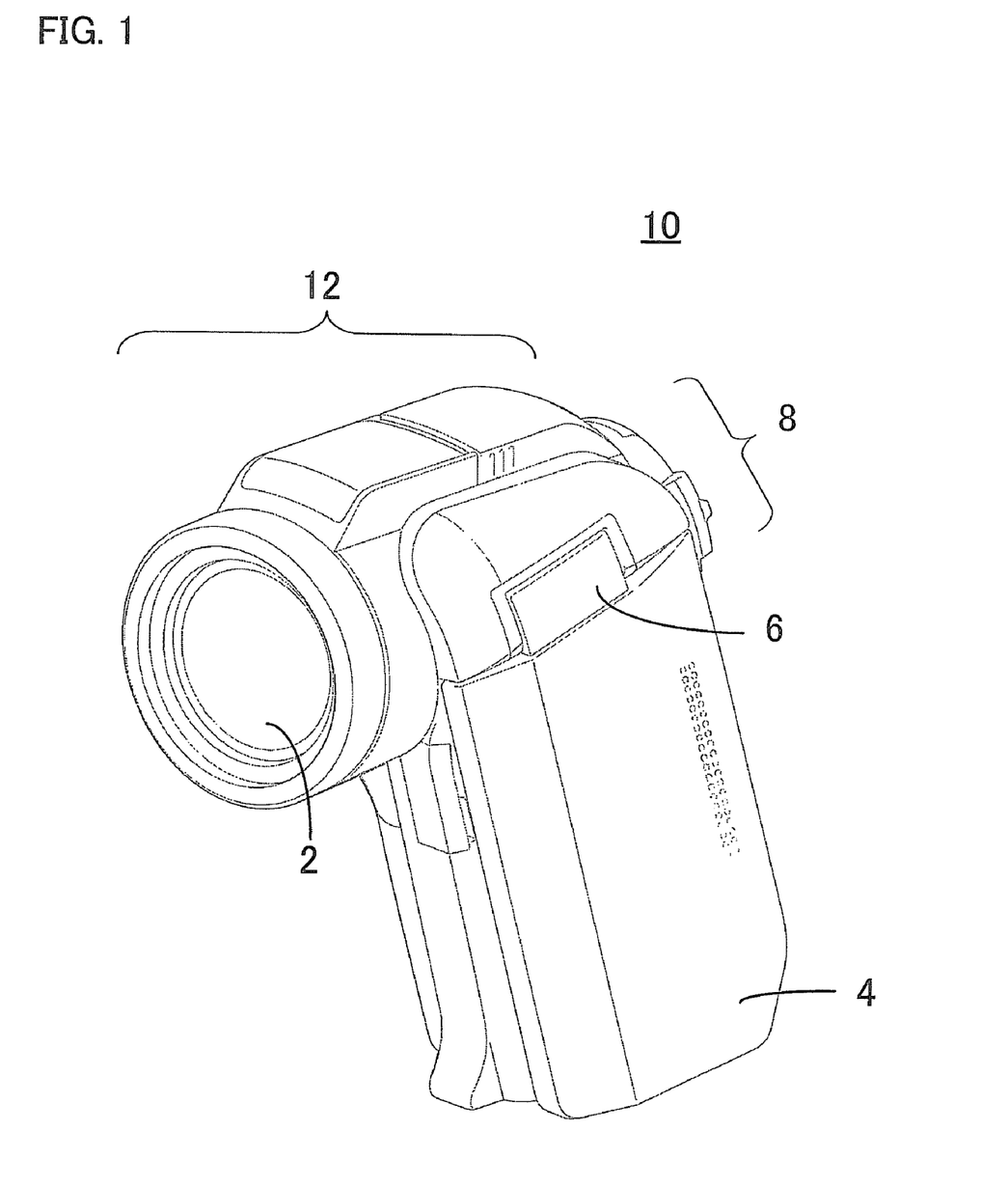
FIG. 1 is an outline view showing a configuration of an electronic camera that is one embodiment of the present invention.
Figure 2:
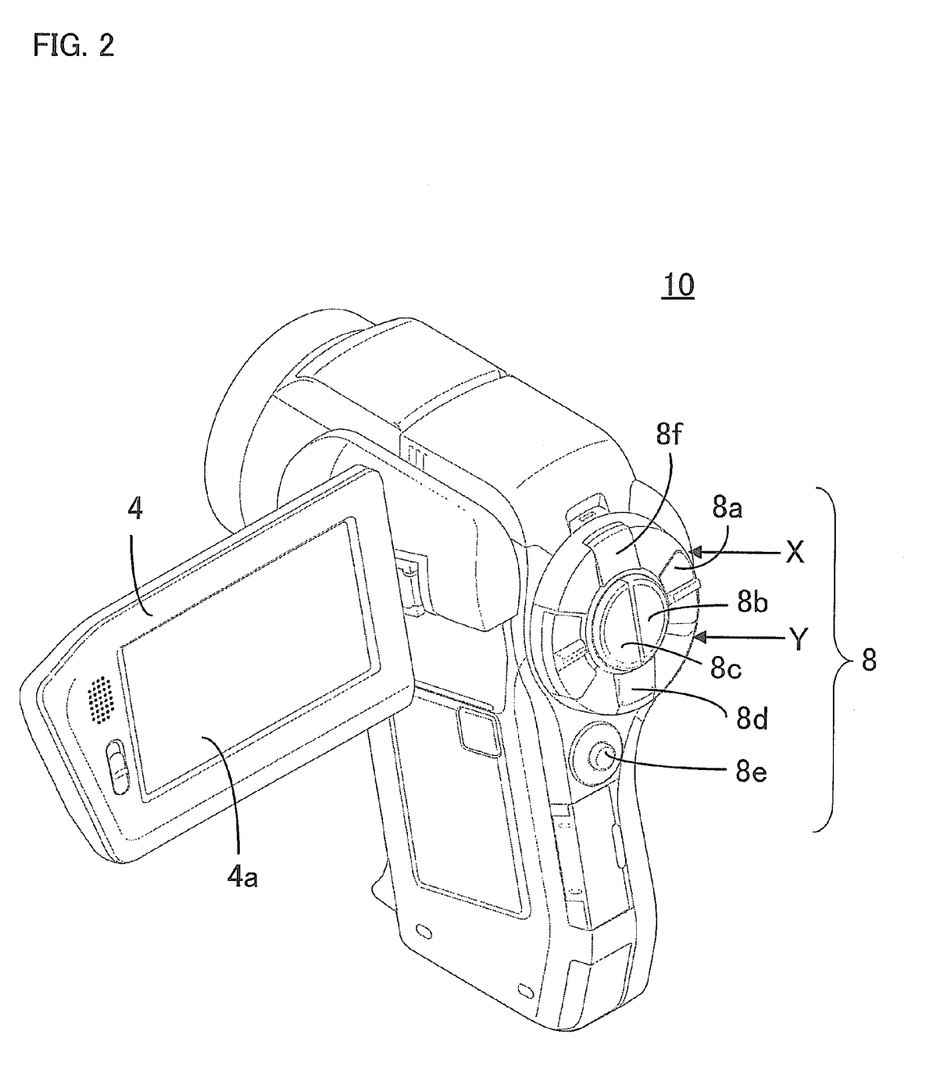
FIG. 2 is an outline view showing another appearance of the electronic camera that is one embodiment of the present invention.

An outline view of the electronic camera 10 is shown in FIG. 1 and FIG. 2. FIG. 1 is a perspective view showing a front surface of the electronic camera 10, and FIG. 2 is a perspective view showing a rear surface of the electronic camera 10.

As shown in FIG. 1 and FIG. 2, the electronic camera 10 is provided with: an imaging portion 12 including at least a lens portion 2; a finder portion 4 including an LCD monitor 4a; a hinge potion 6; and operation buttons 8a to 8f.

FIG. 1 is a diagram showing a state in which the finder portion 4 is housed in an apparatus main body having the imaging portion 12 so that the LCD monitor 4a is not exposed. Normally, a user does not perform a shooting operation with this form. FIG. 2 shows a rear surface of FIG. 1, and shows a state in which the finder portion 4 is turned via the 2-shaft hinge portion 6 and the LCD monitor 4a is positioned substantially vertically to the apparatus main body.

The LCD monitor 4a displays a reproduced image and a through image, and also functions as an electronic finder as a result of the through image being displayed while waiting for shooting. The operation buttons 8a to 8f configuring the operating portion 8 are described in detail below. Numeral 8a is an image/reproduce change-over switch for switching an operating mode to one of an imaging mode and a reproducing mode. When the image/reproduce change-over switch 8a is moved to an X position (top position), a current mode is set to the imaging mode, and when it is moved to a Y position (bottom position), the current mode is set to the reproducing mode. Numeral 8b is a moving-image shooting start/end button for staring/ending, when being depressed, a moving-image shooting process of the imaging portion 12, and numeral 8c is a still-image shooting button for instructing a still-image shooting process. Numeral 8d is a menu button, and when it is depressed, a selectable menu setting item, etc., are displayed on the LCD monitor 4a. Numeral 8e is a cursor key so configured that it is in a state of being inclined in one of directions when being manually operated in four directions (up, down, right, and left directions) and it is returned back to the original neutral position from the inclined state when being canceled from the manual operation. When operated in one of the four directions, it becomes possible to select and instruct the item, etc., displayed within the LCD monitor 4a. A center portion of the four directions of the cursor key 4e serves also as a set key, and as a result of being depressed when at a neutral position of the four directions, a setting operation is performed, the item, etc., are determined, and the item selected and determined is set. Also, numeral 8f is a switching button for switching a display image size of the through image displayed on the LCD monitor 4a. When the switching button 8f is depressed, a switching process of through images, which is described later, is performed.

Figure 3:
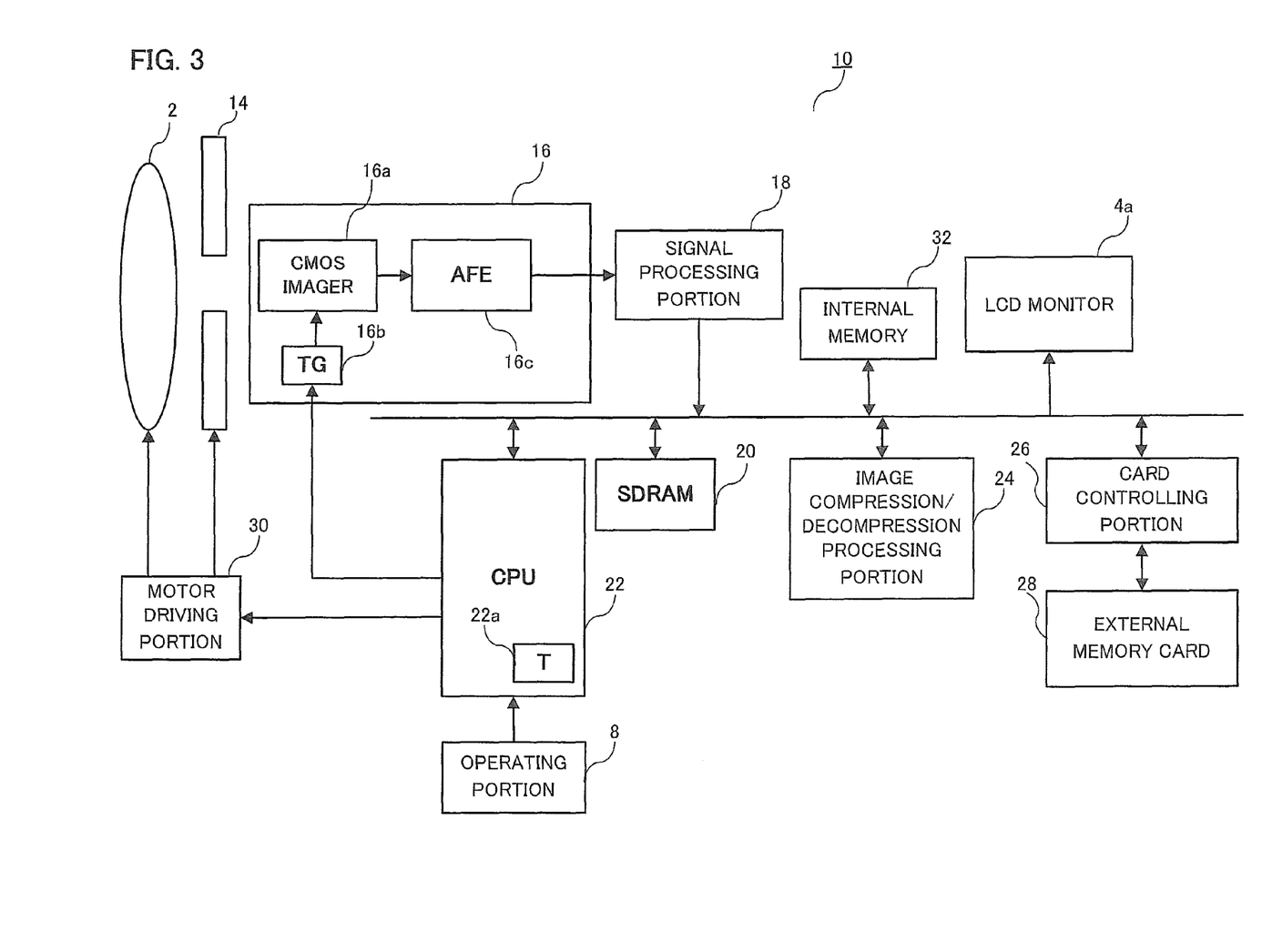
FIG. 3 is a block diagram showing the configuration of the electronic camera that is one embodiment of the present invention.

Subsequently, by using FIG. 3 which is a block diagram of the interior of the electronic camera 10 shown in FIG. 1 and FIG. 2, the operation of the electronic camera 10 is described in more detail.

The electronic camera 10 is configured to include: the lens portion 2; the LCD monitor 4a; the operating portion 8, an aperture mechanism 14; a CMOS imager unit 16 including a CMOS imager 16a, a timing generator (TG) 16b, and an AFE portion 16c; a signal processing portion 18; an SDRAM 20; a CPU 22 including a timer T22a; an image compression/decompression processing portion 24; a card controlling portion 26; an external memory card 28; a motor driving portion 30; and an internal memory 32.

The lens portion 2 focuses an optical image of an object onto an imaging surface of the CMOS imager 16a, which is an imaging element. Also, the lens portion 2 is adjusted in movement in an optical axis direction based on an output signal of the CMOS imager 16a. When the aperture mechanism 14 is controlled, light entering from the lens portion 2 to the CMOS imager 16a is adjusted. The lens portion 2 and the aperture mechanism 14 are adjusted by the motor driving portion 30.

Figure 4:
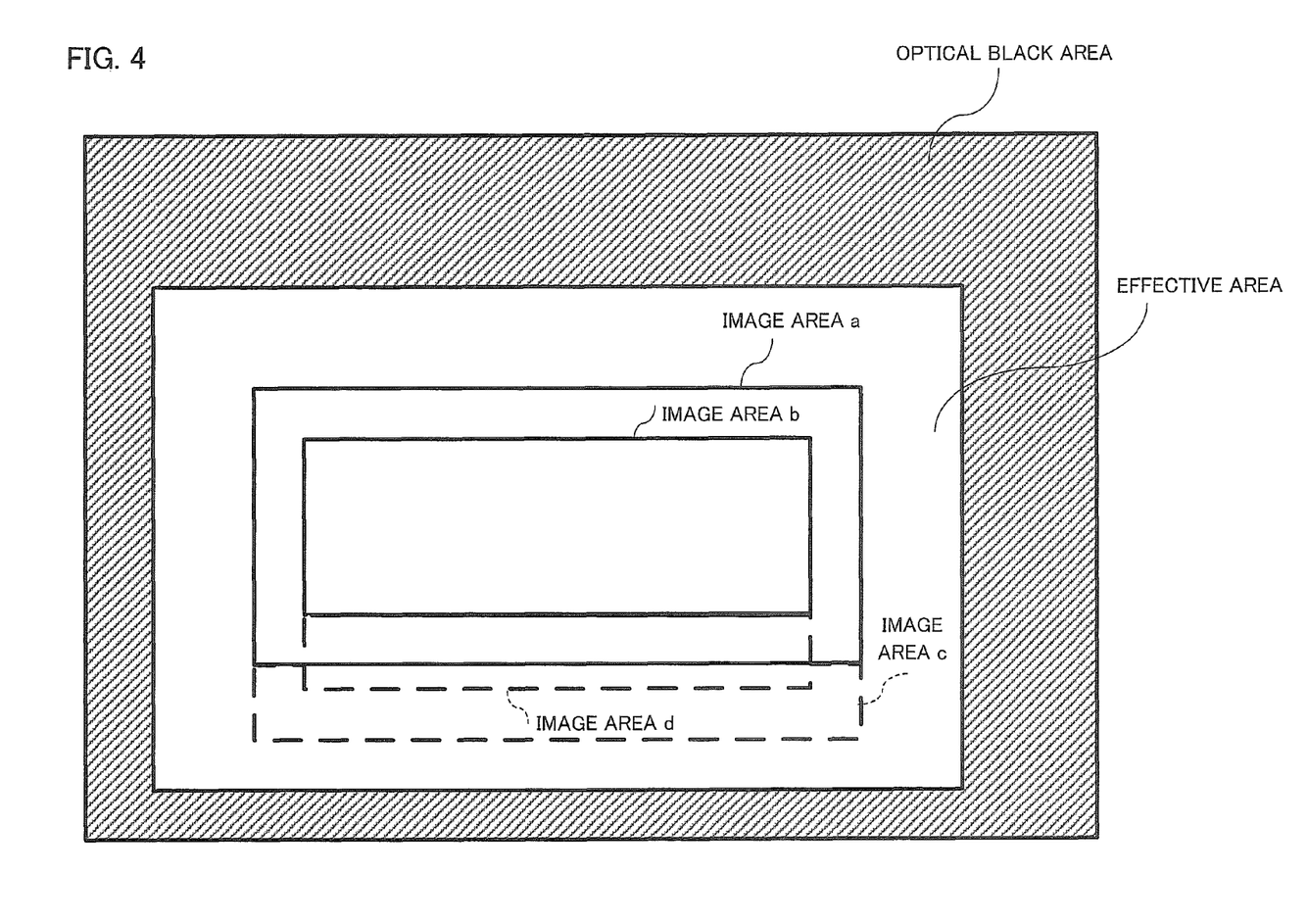
FIG. 4 is an illustrative view showing a configuration of an imaging element of the electronic camera that is one embodiment of the present invention.

FIG. 4 is a diagram showing a light-receiving surface of the CMOS imager 16a. To the CMOS imager 16a, a primary color filter (Bayer arrangement) is attached, and on the light-receiving surface, an effective area and an optical black area (OB area) are formed. More specifically, the effective area is formed at a center of the light-receiving surface, and the OB area is formed at a periphery of the light-receiving surface.

The CMOS imager 16a has an amplifier for each pixel and reads out an analog video signal for each pixel. The optical image of the object is focused on the light-receiving surface of the CMOS imager 16a, and is outputted as an analog imaging signal according to a transfer signal which is produced by the TG 16b and is required for driving the CMOS imager 16a. The TG 16b uses a predetermined image area instructed by the CPU 22 as an effective pixel, and outputs the effective pixel as the analog imaging signal from the CMOS imager 16a.

In this embodiment, as shown in FIG. 4, as the image area, image areas a to d exist within the effective area. This is described by using FIG. 4; the image area a corresponds to a rectangular dimension surrounded by solid lines, and the image area b corresponds to a dimension surrounded by solid lines within the image area a. The image area c corresponds to a dimension that is obtained by adding the image area a and a dimension surrounded by chained lines shown, from points at which a bottom side of the image area a and lateral sides thereof intersect, in a vertical direction relative to the bottom side of the image area a and in parallel to the bottom side thereof. Moreover, the image area d corresponds to a dimension surrounded by chained lines shown, from points at which a bottom side of the image area b and lateral sides thereof intersect, in a vertical direction relative to the bottom side and in parallel to the bottom side of the image area b.

The image areas a to d are selected based on the set image size on the menu setting used by the user. The image area a in this embodiment corresponds to an image size, having an aspect ratio of 16:9, for still-image shooting; the image area b corresponds to an image size, having an aspect ratio of 16:9, for moving-image shooting; the image area c corresponds to an image size, having an aspect ratio of 4:3, for still-image shooting; and the image area d corresponds to an image size, having an aspect ratio of 4:3, for moving-image shooting. Further, as compared to the dimensions of the image areas a and c for still-image shooting, those of the image areas b and d are set smaller so that an electronic image-stabilizing process can be performed during a moving-image shooting.

Further, the electronic camera 10 of this embodiment is able to select a frame rate in the moving-image shooting. As the frame rate, it is possible to select the frame rate from 60 field/second, 60 frame/second, 30 frame/second, and 300 frame/second, for example. When 300 frame/second is selected, pixels are thinned out from the image area c having an aspect ratio of 4:3, and the analog video signal is read out. Hereinafter, the description is provided as follows: normal moving-image shooting in this embodiment is defined as moving-image shooting having a frame rate of 60 frame/second while high-speed moving-image shooting is defined as moving-image shooting having a frame rate of 300 frame/second.

The analog imaging signal outputted from the CMOS imager 16a based on a predetermined image area is inputted in the AFE (Analog Front End) portion 16c, subjected to a correlated double sampling process, a gain adjustment, a clamping process, and a digital-signal converting process, and then, outputted to the signal processing portion 18. In the signal processing portion 18, Y, U, and V signals produced as a result of various signal processes being executed are temporarily accommodated in the SDRAM 20 as the digital image signal. By control of the CPU 22, when a still-image shooting operation is performed, the digital image signal accommodated in the SDRAM 20 is subjected to a compressing process of a JPEG standard in the image compression/decompression processing portion 24, and when a moving-image shooting operation is performed, subjected to a compressing process of an MPEGH 264 standard. As a result, the accommodated digital image signal is converted into compressed image data. Then, as a result of being controlled from the CPU 22, the card controlling portion 26 controls the external memory card 28 so as to record the compressed image data.

Further, at a shooting waiting time, the frame rate is set to 30 frame/second. In this state, the above-described similar signal processes and a thinning-out process by control of the CPU 22 are performed on the analog imaging signal outputted from the CMOS imager 16a based on a predetermined image area, the resultant signal is outputted as the digital image signal on the LCD monitor 4a, and displayed on the LCD monitor 4a as a through image having a frame rate of 30 frame/second.

The operating portion 8 includes the moving-image shooting start/end button 8b and the still-image shooting button 8c, as described above. By operating the operating portion 8, the user is able to set a desired image size and normal moving-image shooting/high-speed moving-image shooting. More specifically, when the menu button 8d is depressed, a menu display is appeared on the LCD monitor 4a. The user operates the cursor key 8e in the four directions in order to set to the desired image size, and when the center portion of the cursor key 8e is depressed to determine the setting, setting of the image size and the normal moving-image shooting/high-speed. moving-image shooting is performed. Setting contents of the image size and the normal moving-image shooting/high-speed moving-image shooting set in this setting operation are stored in the internal memory 32.

Further, in the internal memory 32, a flag S is accommodated, and according to the flag S, the CPU 22 determines a mode of the through image to be displayed on the LCD monitor 4a while waiting for shooting. When the flag S is 1, the CPU 22 displays a moving-image-use through image, as the through image displayed on the LCD monitor 4a, and when the flag S is 0, the CPU22 displays a still-image-use through image, as the through image displayed on the LCD monitor 4a.

It is noted that the image size when the setting of the high-speed moving-image shooting is performed is fixed in the image area c having an aspect ratio of 4:3 of the CMOS imager 16a, as described above. Examples of the normal moving-image shooting and the high-speed moving-image shooting are provided, below. In a case where a start of the moving-image shooting operation is executed by depressing the moving-image shooting start/end button 8b, if the aspect ratio of the image size for moving-image shooting, which is set by the user, is 16:9 and the current imaging is the normal moving-image shooting, the analog imaging signal corresponding to the image area b of the CMOS imager 16a is outputted at a frame rate of 60 frame/second. Then, the outputted analog imaging signal is subjected to the above-described processes, and the compressed image data corresponding to the image area b is recorded on the external memory card 28. Further when the aspect ratio of the image size for moving-image shooting, which is set by the user, is 4:3, the compressed image data corresponding to the image area d is recorded. Then, when the moving-image shooting start/end button 8b is depressed again, an end of the moving-image shooting operation is executed. In this manner the moving-image shooting is ended.

Further, in a case where a start of the moving-image shooting operation is executed by depressing the moving-image shooting start/end button 8b, if the high-speed moving-image shooting has been set by the user, the analog imaging signal thinned out from the image area c of the CMOS imager 16a is outputted at a frame rate of 300 frame/second. During this high-speed moving-image shooting, even when the moving-image shooting start/end button 8b is depressed again, the moving-image shooting is not ended. Rather than that, for a predetermined time period, 10 seconds, for example, processes such as the imaging process, signal process, and recording process are continued. Normally, the imaging process, the signal process, the recording process, etc., are controlled by the CPU 22, and thus, a speed of a process required until the analog imaging signal outputted from the CMOS imager 16a is recorded on the external memory card 28 depends on a processing performance of the CPU 22. Therefore, in this embodiment, in consideration of the processing performance of the CPU 22, imaging and recording times of the high-speed moving-image shooting are previously set. Moreover, in this embodiment, other tan depressing of the moving-image shooting start/end button 8b, any operation such as depressing of the menu button, operating of a zoom button not shown, and a power-OFF operation of the electronic camera 10 is unacceptable.

Subsequently, an example of the still-image shooting is provided. In a case where the still-image shooting operation is executed by depressing the still-image shooting button 8c, if the aspect ratio of the image size for still-image shooting, which is set by the user, is 16:9, the compressed image data corresponding to the image area a is recorded, and if the aspect ratio is 4:3, the compressed image data corresponding to the image area c is recorded.

Subsequently, the through image displayed on the LCD monitor 4a while waiting for shooting in this embodiment is described. For example, it is assumed that the user selects an image size, having an aspect ratio of 16:9, for still-image shooting and an image size, having an aspect ratio of 16:9, for moving-image shooting. At this time, as a through image outputted on the LCD monitor 4a, the moving-image-use through image corresponding to the image size for moving-image shooting is displayed. In this embodiment, as the through image, the moving-image-use through image, and the still-image-use through image, described next, are displayed on the LCD monitor 4a. As an initial setting, however, the moving-image-use through image is displayed on the LCD monitor 4a as the through image. To be described in more detail, the moving-image-use through image is an image obtained by performing a thinning-out process intended to display on the LCD monitor 4a based on the analog imaging signal outputted from pixels corresponding to the image area b.

Herein, in a case where the user depresses the moving-image shooting start/end button 8b so as to execute the moving-image shooting, if the user sees the moving-image-use through image displayed on the LCD monitor 4a, the user is able to intuitively understand that the imaging is performed in the image area to be imaged. However, even when the moving-image-use through image is being displayed, if the user half-depresses the still-image shooting button 8c, the still-image-use through image based on the analog imaging signal corresponding to the image area a is displayed on the LCD monitor 4a. Further, when the user fully depresses the still-image shooting button 8c to perform the still-image shooting operation, the compressed image data based on the analog imaging signal corresponding to the image area a is recorded on the external memory card 28.

In this case, while waiting for shooting that lasts until the user half-depresses the still-image button 8c, the user ends up with monitoring the moving-image-use through image displayed on the LCD monitor 4a, and thus, it is difficult to envision the still image actually recorded on the external memory card 28.

Therefore, in this embodiment, it is so configured that when the switching button 8f is depressed, the through image, while waiting for shooting, displayed on the LCD monitor 4a is switched from the moving-image-use through image to the still-image-use through image, or from the still-image-use through image to the moving-image-use through image. Therefore, while the user waits for imaging, it is possible to easily and quickly display the through image desired by the user on the LCD monitor 4a.

Subsequently, a specific operating example is described. When the user wishes to primarily perform the still-image shooting, if the switching button 8f is operated, the still-image-use through image is displayed, and when the user wishes to primarily perform the moving-image shooting, if the switching button 8f is operated, the moving-image-use through image is displayed. Thus, it is possible to display the through image desired by the user on the LCD monitor 4a with a simple operation, and convenience for the user is improved.

Figure 5:
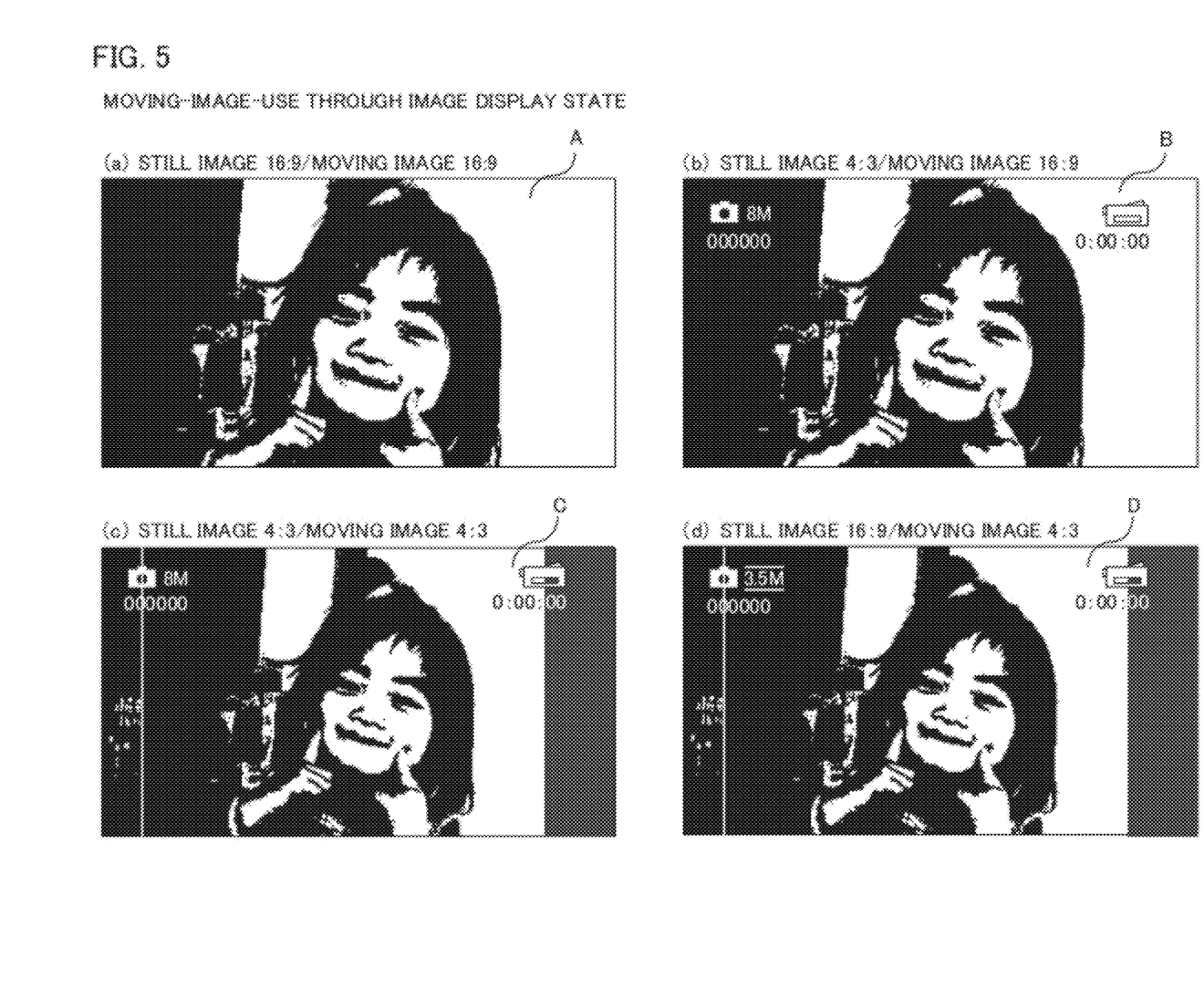
FIG. 5 is an illustrative view showing one portion of transition of a through image displayed on an LCD monitor of the electronic camera that is one embodiment of the present invention.
Figure 6:
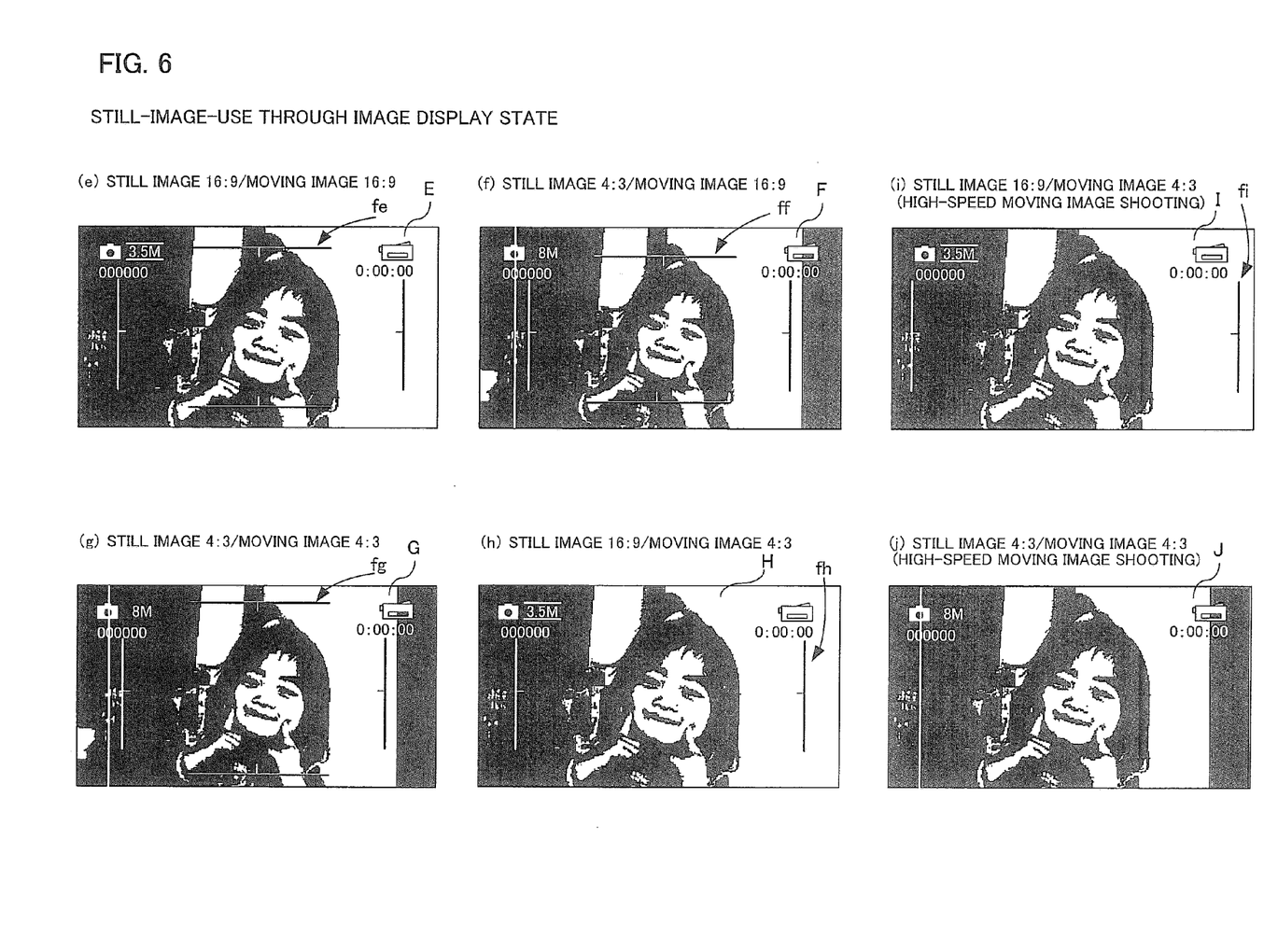
FIG. 6 is an illustrative view showing another portion of transition of the through image displayed on the LCD monitor of the electronic camera that is one embodiment of the present invention.
Figure 7:
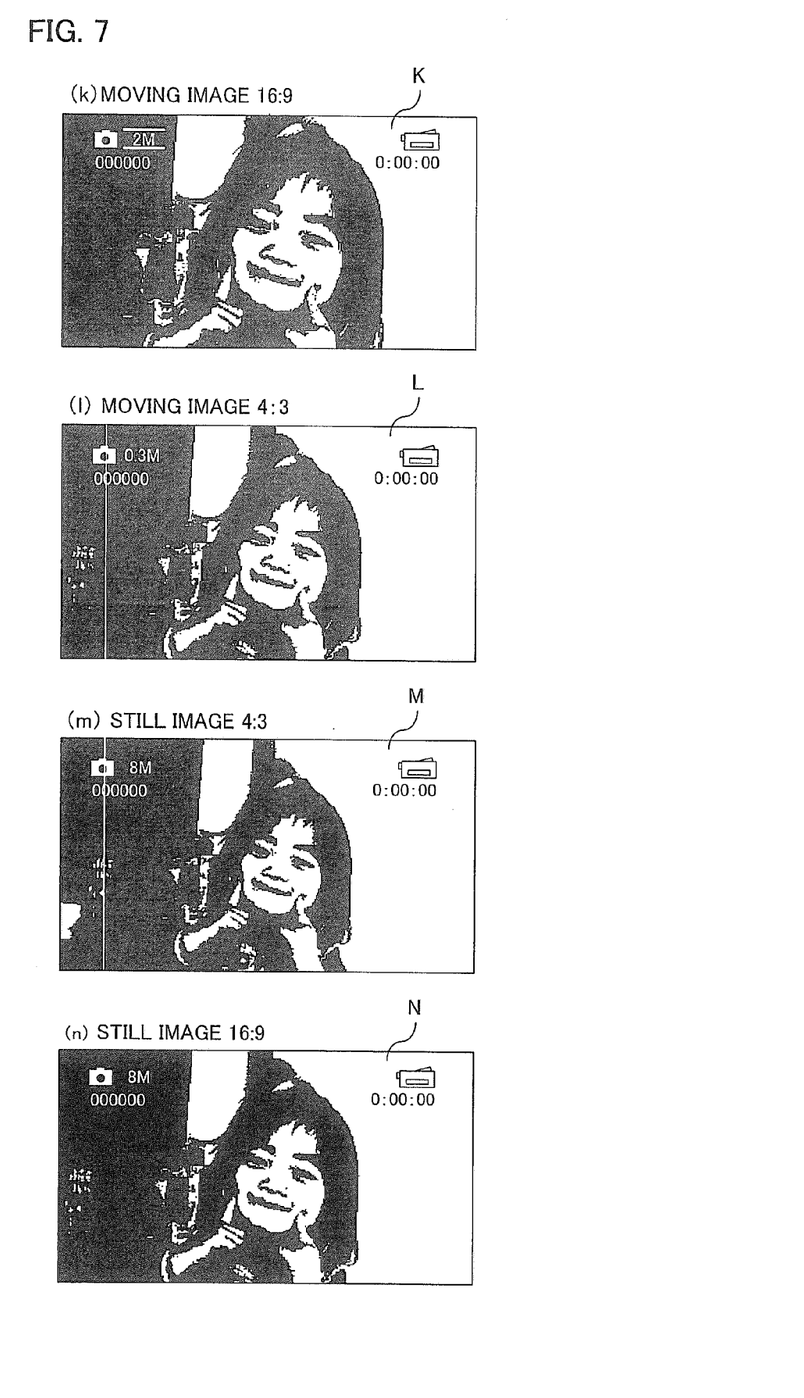
FIG. 7 is an illustrative view showing still another portion of transition of the through image displayed on the LCD monitor of the electronic camera that is one embodiment of the present invention.

FIG. 5 to FIG. 7 are diagrams showing a display transition of the still-image-use through image and the moving-image-use through image displayed on the LCD monitor 4a as a result of the switching button 8f being operated, and an image displayed on the LCD monitor 4a when the still-image shooting or the moving-image shooting is performed.

FIG. 5(a) shows a screen on which a moving-image-use through image A, which is set to an image size having an aspect ratio of 16:9 for still-image shooting and an image size having an aspect ratio of 16:9 for moving-image shooting, is displayed on the LCD monitor 4a. Likewise, FIG. 5(b) to FIG. 5(d) show screens on which moving-image-use through images B to D are displayed on the LCD monitor 4a, respectively. In FIG. 5(b), the image size is set to an aspect ratio of 4:3 for still-image shooting and an aspect ratio of 16:9 for moving-image shooting; in FIG. 5(c), the image size is set to an aspect ratio of 4:3 for still-image shooting and an aspect ratio of 4:3 for moving-image shooting; and in FIG. 5(d), the image size is set to an aspect ratio of 16:9 for still-image shooting and an aspect ratio of 4:3 for still-image shooting.

Then, when the switching button 8f is depressed in a state where the moving-image-use through image A shown in FIG. 5(a) is displayed, a still-image-use through image E shown in FIG. 6(e) is displayed on the LCD monitor 4a. Subsequently, within the still-image-use through image E, a framework fe (indicated by guide lines at right, left, top, and bottom) corresponding to the moving-image-use through image A is superposed.

Likewise, when the switching button 8f is depressed in a state where the moving-image-use through image B shown in FIG. 5(b) is displayed, a still-image-use through image F, shown in FIG. 6(f), superposed with a framework ff corresponding to the moving-image-use through image B is displayed on the LCD monitor 4a. Further, when the switching button 8f is depressed in a state where the moving-image-use through image C shown in FIG. 5(c) is displayed, a still-image-use through image Q shown in FIG. 6(g), superposed with a framework fg corresponding to the moving-image-use through image C is displayed on the LCD monitor 4a. Moreover, when the switching button 8f is depressed in a state where the moving-image-use through image D shown in FIG. 5(d) is displayed, a still-image-use through image R shown in FIG. 6(h), superposed with a framework fh corresponding to the moving-image-use through image D is displayed on the LCD monitor 4a.

In FIG. 6(h), the guide lines of the framework superposed on the still-image-use through image H are shown at right and left only. The reason for this is that since a height of the moving image is the same as that of the still image, the still-image-use through image H is displayed on the LCD monitor 4a without a need of superposing the top and bottom guide lines.

Further, when the switching button 8f is depressed in a state where the moving-image-use through images E to H shown in FIGS. 6(e) to 6(h) are displayed, the still-image-use through images A to D shown in FIGS. 5(a) to 5(d) are displayed on the LCD monitor 4a.

FIG. 6(i) shows a still-image-use through image I displayed on the LCD monitor 4a, which is obtained by depressing the switching button 8f in a state where the moving-image-use through image D of which the aspect ratio of the image size for still-image shooting shown in FIG. 5(d) is 16:9 and to which the high-speed moving-image shooting mode is set is displayed. On this still-image-use through image I, a framework fi (indicated by guide lines at right and left) corresponding to the moving-image-use through image D is superposed. FIG. 6(j) shows a still-image-use through image J displayed on the LCD monitor 4a, which is obtained by depressing the switching button 8f in a state where the moving-image-use through image C of which the aspect ratio of the image size for still-image shooting shown in FIG. 5(c) is 4:3 and to which the high-speed moving-image shooting mode is set is displayed. The still-image-use through image J is based on the analog imaging signal outputted from the image area A, and thus, even when the switching button 8f is depressed, there is no change as the through image monitored by the user.

Then, when the moving-image shooting starting operation is performed as a result of the moving-image shooting start/end button 8b being depressed in a state where the moving-image-use through image A or B shown in FIG. 5(a) or FIG. 5(b) is displayed, a moving-image shooting image K, shown in FIG. 7(k), based on the image area b is displayed on the LCD monitor 4a. Further, likewise, when the moving-image shooting starting operation is performed as a result of the moving-image shooting start/end button 8b being depressed in a state where the still-image-use through image E or F superposed with the framework fe or the framework ff shown in FIG. 6(e) or FIG. 6(f) is displayed, a moving-image shooting image K (shown in FIG. 7(k)) from which the framework fe or ff is canceled is displayed on the LCD monitor 4a. The moving-image shooting image K, based on the image area b, has an aspect ratio of 16:9.

When the moving-image shooting starting operation is performed as a result of the moving-image shooting start/end button 8b being depressed in a state where the moving-image-use through image C or D shown in FIG. 5(c) or FIG. 5(d) is displayed, a moving-image shooting image L, shown in FIG. 7(l), is displayed on the LCD monitor 4a. The moving-image shooting image L, having an aspect ratio 4:3, is based on the image area d. Further likewise, when the moving-image shooting starting operation is performed as a result of the moving-image shooting start/end button 8b being depressed in a state where the still-image-use through image G or H superposed with the framework fg or the framework fh shown in FIG. 6(g) or FIG. 6(h) is displayed, a moving-image shooting image L which is based on the image area d and from which the framework fg or fh is canceled is displayed on the LCD monitor 4a, as shown in FIG. 7(l).

When the still-image shooting button 8c continues to be half-depressed in a state where the moving-image-use through image B or C shown in FIG. 5(b) or FIG. 5(c) is displayed on the LCD monitor 4a, a still-image-use through image M shown in FIG. 7(m) is displayed on the LCD monitor 4a. The still-image-use through image M, having an aspect ratio of 4:3, is based on the image area c. Moreover, when the still-image shooting button 8c is fully depressed, a still image having an aspect ratio of 4:3 and being based on the image area c is displayed on the LCD monitor 4a for one second, and thereafter, the moving-image-use through image B or C shown in FIG. 5(b) or FIG. 5(c) is displayed again. Further, likewise, when the still-image shooting button 8c continues to be half-depressed in a state where the still-image-use through image F or G shown in FIG. 6(f) or FIG. 6(g) is displayed on the LCD monitor 4a, a still-image-use through image M, based on the image area c, from which the framework ff or the framework fg is canceled is displayed on the LCD monitor 4a, as shown in FIG. 7(m).

When the still-image shooting button 8c continues to be half-depressed in a state where the moving-image-use through image A or D shown in FIG. 5(a) or FIG. 5(d) is displayed on the LCD monitor 4a, a still-image-use through image N having an aspect ratio of 16:9 and being based on the image area a shown in FIG. 7(n) is displayed on the LCD monitor 4a. Further, when the still-image shooting button 8c is fully depressed, a still image having an aspect ratio of 16:9 and being based on the image area a is displayed on the LCD monitor 4a for one second, and the moving-image-use through image A or D shown in FIG. 5(a) or FIG. 5(d) is displayed again.

Likewise, when the still-image shooting button 8c continues to be half-depressed in a state where the still-image-use through image E or H shown in FIG. 6(e) or FIG. 6(h) is displayed on the LCD monitor 4a, a still-image-use through image N, based on the image area a, from which the framework fe or the framework fh is canceled is displayed on the LCD monitor 4a, as shown in FIG. 7(n).

Figure 8:
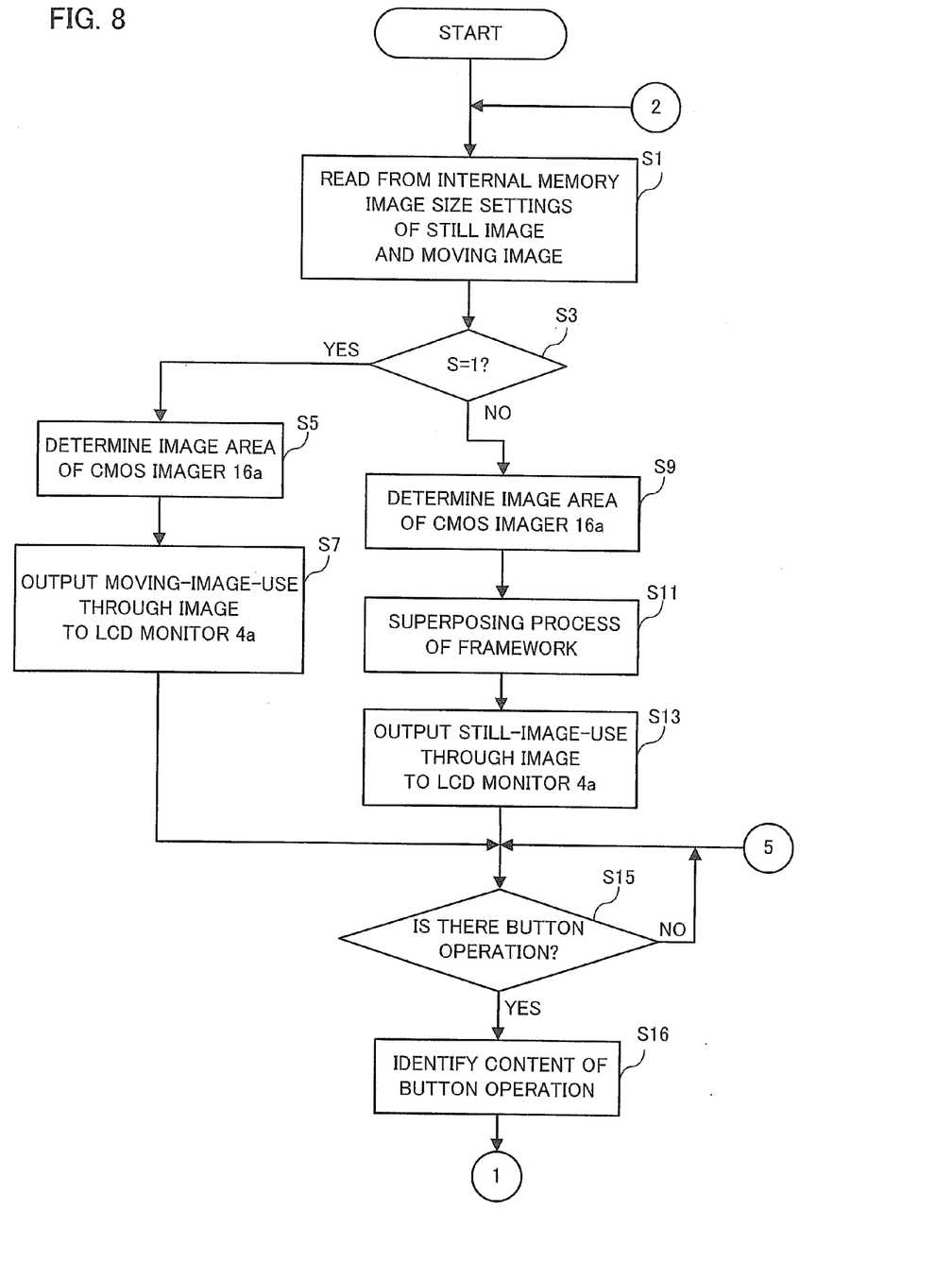
FIG. 8 is a flowchart showing one portion of an operation of the electronic camera that is one embodiment of the present invention.
Figure 9:
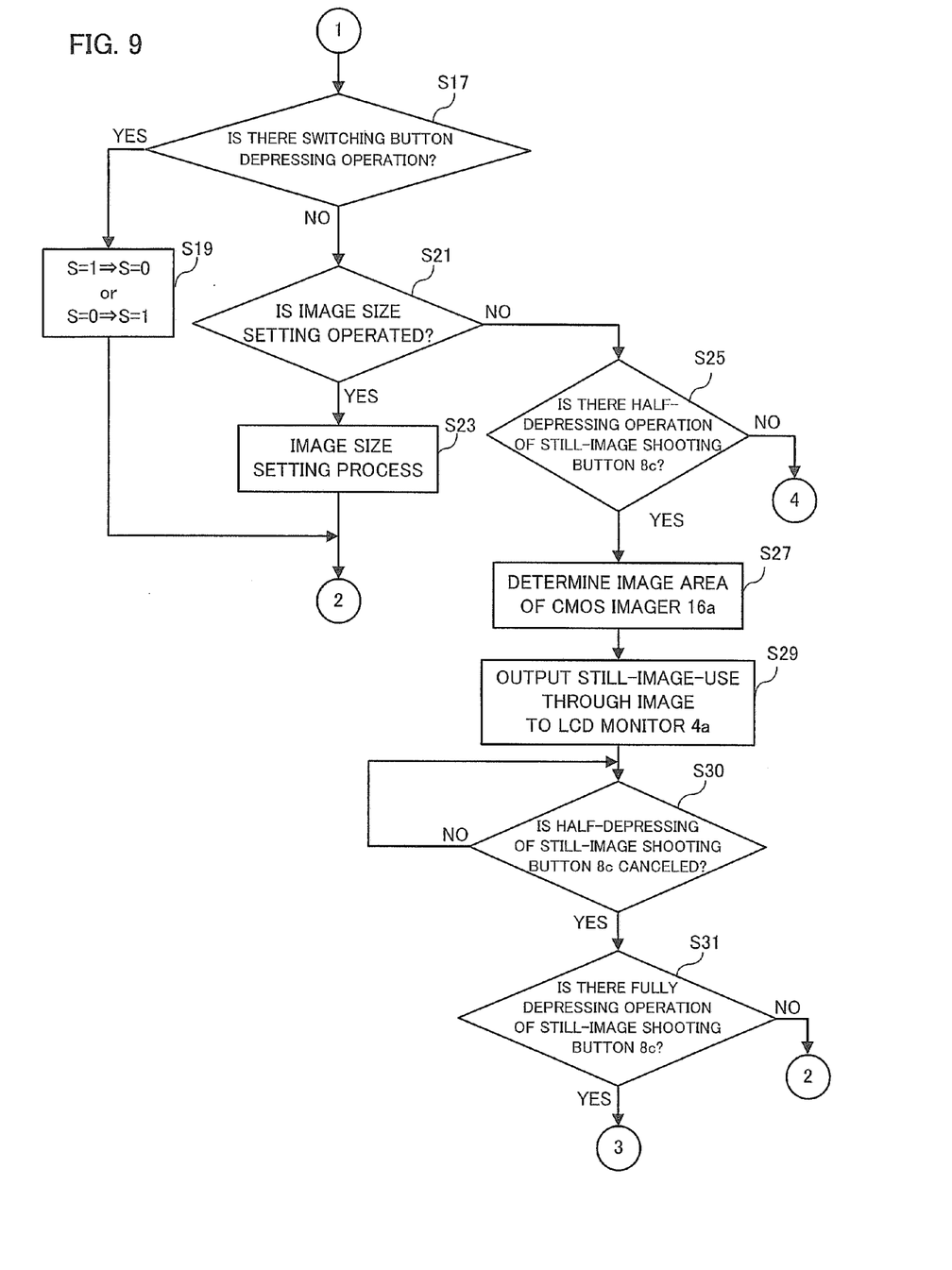
FIG. 9 is a flowchart showing another portion of the operation of the electronic camera that is one embodiment of the present invention.
Figure 10:
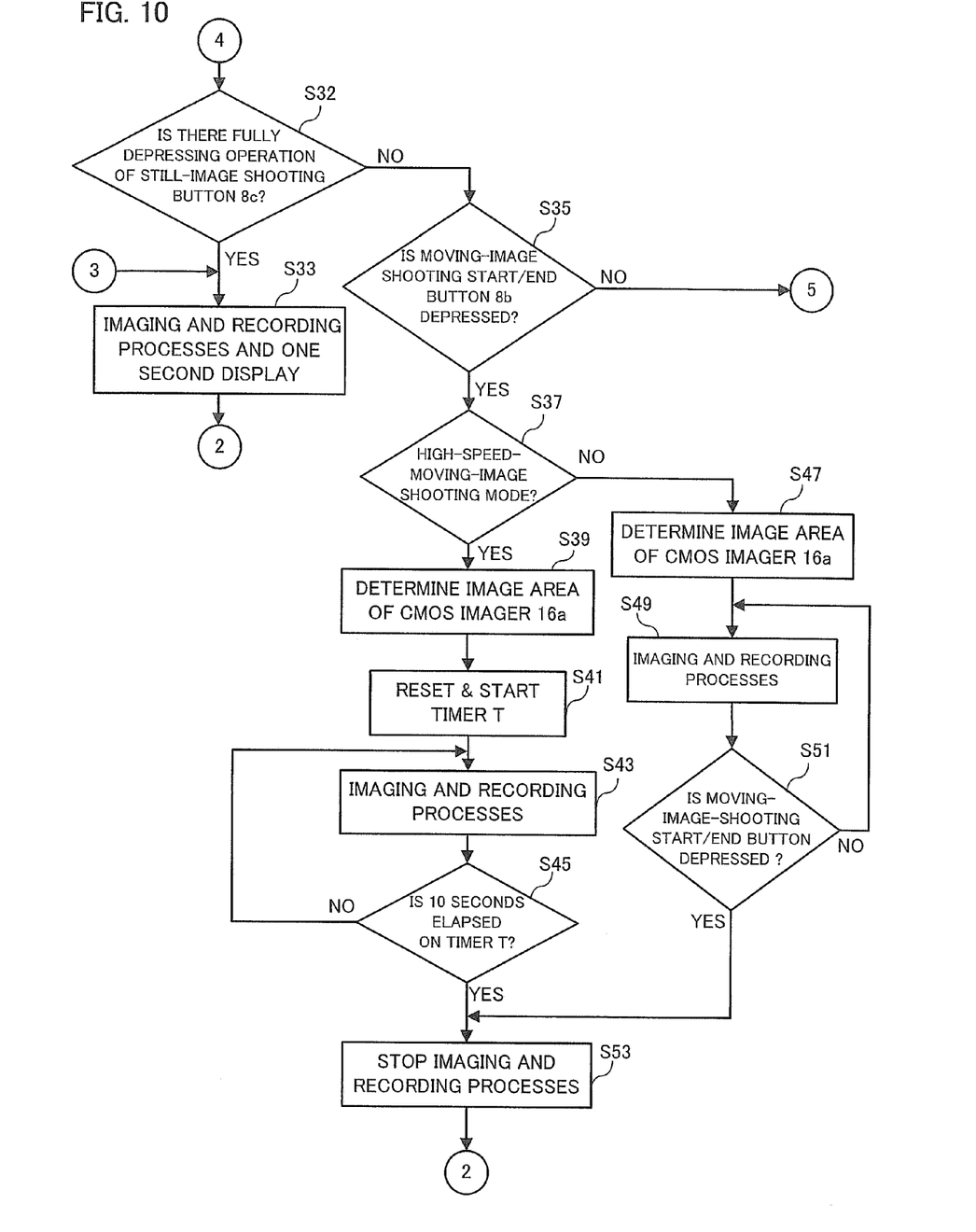
FIG. 10 is a flowchart showing another portion of the operation of the electronic camera that is one embodiment of the present invention.

Subsequently, a process executed by the above-described CPU 22, i.e., a process for switching the still-image-use through image display/moving-image-use through image display associated with the still-image and moving-image shooting is described in detail by using FIG. 8 to FIG. 10.

When the electronic camera 10 is changed from a state where the LCD monitor 4a in FIG. 1 is not exposed to a state where the LCD monitor 4a is exposed as shown in FIG. 2, in a step S1, the CPU 22 firstly detects whether the current mode is a moving-image-use through image mode (stored in the internal memory 32) in which the moving-image-use through image is displayed on the LCD monitor 4a (flag S=1) or a still-image-use through image mode in which the still-image-use through image is displayed on the LCD monitor 4a (flag S=0), and also reads the image size for still image/moving-image shooting. Next, the process proceeds to a step S3. In the step S3, it is determined whether the flag S detected in the step S1 is 1 or 0.

When Yes is determined in the step S1, the process proceeds to a step S5 to determine the image area of the CMOS imager 16a according to the image size for moving-image shooting detected in the step S1. For example, when the set image size is the image size having an aspect ratio of 4:3, the image area is determined to be the image area d. Subsequently, the process proceeds to a step S7. In this step, based on the analog imaging signal outputted from the image area determined in the step S5, the digital image signal on which the above-described processes such as a signal process are performed is outputted, as the moving-image-use through image, to the LCD monitor 4a. Then the process proceeds to a step S15.

When NO is determined in the step S3, the process proceeds to a step S9 so as to determine the image area of the CMOS imager 16a according to the image size for still-image shooting detected in the step S1. For example, when the set image size is the image size having an aspect ratio of 16:9, the image area is determined to be the image area a. Subsequently, the process proceeds to a step S11. In the step S11, the framework based on the image size for moving-image shooting detected in the step S1 is superposed on the digital image signal on which the above-described processes such as a signal process are performed, based on the analog imaging signal outputted from the image area determined in the step S9. Thereafter, the process proceeds to a step S13 so as to output the digital image signal superposed with the framework to the LCD monitor 4a as the still-image-use through image. Then, the process proceeds to the step S15.

In the step S15, whether or not the button operation in the operating portion 8 is performed is determined, and the process is waited until it is determined that the button operation is performed. Then, when YES is determined in the step S15, the process proceeds to a step S16 so as to identify the button operation. Thereafter, the process proceeds to a step S17. In the step S17, it is determined whether or not the button operation identified in the step S16 is a depressing operation of the switching button 8f. When YES is determined in the step S17, the process proceeds to a step S19 so as to set 0 when the flag S detected in the step S1 is 1 and set to 1 when the detected flag S is 0. Thereafter the process returns to the step S1.

When NO is determined in the step S17, the process proceeds to a step S21 so as to determine whether or not the button operation identified in the step S16 is a setting operation of the image size for still-image or moving-image shooting. When YES is determined in the step S21, the image size based on the setting operation is stored in the internal memory 32. Thereafter, the process returns to the step S1.

When NO is determined in the step S21, the process proceeds to a step S25 so as to determine whether or not the button operation identified in the step S16 is a half-depressing operation of the still-image shooting button 8c. When YES is determined in the step S25, the process proceeds to a step S27 so as to determine the image area of the CMOS imager 16a. As described above, when the set image size is the image size having an aspect ratio of 16:9, the current image area is determined to be the image area a. Subsequently, the process proceeds to a step S29.

In the step S29, based on the analog imaging signal outputted from the image area determined in the step S27, the digital image signal on which the above-described processes such as a signal process are performed is outputted, as the still-image-use through image, to the LCD monitor 4a. Subsequently, the process proceeds to a step S30 so as to determine whether or not the half-depressing operation of the still-image shooting button 8c is canceled, and the process is waited until YES is determined. When YES is determined in the step S30, the process proceeds to a step S31. In the step S31, it is determined whether or not the still-image shooting button 8c is fully depressed. When YES is determined, the process proceeds to a step S33, and when NO is determined, the process returns to the step S1.

Further, when NO is determined in the step S25, the process proceeds to a step S32. In the step S32, it is determined whether or not the button operation identified in the step S16 is the fully depressing operation of the still-image shooting button 8c. When YES is determined in the step S32, the process proceeds to the step S33 so as to control to perform the above-described processes such as a signal process based on the analog imaging signal outputted from the set image area and to record the resultant still image on the external memory card 28. At this time, the still image recorded on the external memory card 28 is thinned out, and the thinned-out image is outputted to the LCD monitor 4a. Then, the process returns to the step S1.

Further, when NO is determined in the step S32, the process proceeds to a step S35 so as to determine whether or not the button operation identified in the step S16 is the depressing operation of the moving-image shooting start/end button 8b. When NO is determined in the step S35, the process returns to the step S15, and when YES is determined, the process proceeds to a step S37.

In the step S37, it is determined whether or not the high-speed moving-image shooting mode is set. When YES is determined in the step S37, the process proceeds to a step S39 so as to determine the image area of the CMOS imager 16a. As described above, in the high-speed moving-image shooting mode in this embodiment, the aspect ratio of the image size is to be determined as the image area a having an aspect ratio of 4:3. Thereafter, the process proceeds to a step S41. In the step S41, the timer T22a within the CPU 22 is reset and started so as to measure a time period. Then, the process proceeds to a step S43 to control to perform the above-described processes such as a signal process on the analog imaging signal outputted from the image area determined in the step S39, and record the resultant signal on the external memory card 28. Subsequently, the process proceeds to a step S45 so as to determine whether or not 10 seconds has been elapsed on the timer T22a. When NO is determined, the imaging/recording process in the step S43 is continued until YES is determined in the step S45. When YES is determined, the process proceeds to a step S53 to stop the above-described imaging and recording process. Then, the process returns to the step S1.

Further, when NO is determined in the step S37, the process proceeds to a step S47. When NO is determined in the step S37, the current mode is the normal moving-image shooting mode. In the step S47, the image area of the CMOS imager 16a is determined. As described above, when the set image size is an image size having an aspect ratio of 16:9, the current image area is determined to be the image area b. Subsequently, the process proceeds to a step S49. In the step S49, it is so controlled that according to the set frame rate, the analog imaging signal is outputted from the image area determined in the step S47, the above-described processes such as a signal process are performed on the analog imaging signal, and the resultant signals are sequentially recorded on the external memory card 28. Then, the process proceeds to a step S51 so as to determine whether or not the moving-image shooting start/end button 8b is depressed again. When NO is determined, the process returns to the step S49, and when YES is determined, the process proceeds to the step S53 so as to end the imaging/recording process. Thereafter, the process returns to the step S1.

Thus, in the electronic camera 10 according to this embodiment, while waiting for shooting that lasts until the user performs the shooting operation, the moving-image-use through image and the still-image-use through image displayed on the LCD monitor 4a are switched easily by depressing the switching button 8f. Therefore, the user is able to display the through image that satisfies a shooting condition desired by each user. Thereby, the user becomes able to more easily confirm an imaging range, and the convenience is improved.

Further, also when the still-image-use through image is displayed, the framework indicating the image size of the moving image is superposed and is displayed on the LCD monitor 4a, and thus, the user is able to comprehend the image size of the moving image while displaying the still-image-use through image, also making it easy to image the moving image.

It is noted that in this embodiment, the CMOS is adopted as the imaging element but a CCD (Charge Coupled Device) may also be adopted.

Further, in this embodiment, the signal on which the digital signal converting process is performed in the AFE portion 16c is directly inputted to the signal processing portion 18. However, that signal may be temporarily accommodated in the SDRAM 20 and then the accommodated signal may be outputted from the SDRAM 20 to the signal processing portion 18.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An imaging apparatus, comprising:
an imager which is capable of repeatedly outputting an image representing a scene captured on an imaging surface;
a displayer which displays an image representing a scene belonging to a noticed area out of the scene captured on said imaging surface based on an output of said imager;
a first designator which designates a first area as the noticed area when accepting a first designating operation;
a second designator which designates a second area as the noticed area when accepting a second designating operation;
a first creator which executes a process of creating a single record image representing a scene belonging to the first area based on the output of said imager in response to a first recording operation which is accepted in parallel with a process of said displayer; and
a second creator which executes a process of creating a plurality of record images continuously representing a scene belonging to the second area based on the output of said imager in response to a second recording operation which is accepted in parallel with the process of said displayer.

2. An imaging apparatus according to claim 1, wherein the first area is defined by a size and a position containing the second area, said imaging apparatus further comprising a processor which executes a process of superposing a frame indicating an edge of the second area on the image displayed by said displayer in association with a process of said first designator.

3. A computer program embodied in a non-transitory tangible medium, which is executed by a processor of an imaging apparatus provided with an imager which repeatedly outputs an image representing a scene captured on an imaging surface, said program comprising:
a displaying step of displaying an image representing a scene belonging to a noticed area out of the scene captured on said imaging surface based on an output of said imager;
a first designating step of designating a first area as the noticed area when accepting a first designating operation;
a second designating step of designating a second area as the noticed area when accepting a second designating operation;
a first creating step of executing a process which creates a single record image representing a scene belonging to the first area based on the output of said imager in response to a first recording operation which is accepted in parallel with a process of said displaying step; and
a second creating step of executing a process which creates a plurality of record images continuously representing a scene belonging to the second area based on the output of said imager in response to a second recording operation which is accepted in parallel with the process of said displaying step.

4. An imaging control method executed by an imaging apparatus provided with an imager which repeatedly outputs an image representing a scene captured on an imaging surface, comprising:
a displaying step of displaying an image representing a scene belonging to a noticed area out of the scene captured on said imaging surface based on an output of said imager;
a first designating step of designating a first area as the noticed area when accepting a first designating operation;
a second designating step of designating a second area as the noticed area when accepting a second designating operation;
a first creating step of executing a process which creates a single record image representing a scene belonging to the first area based on the output of said imager in response to a first recording operation which is accepted in parallel with a process of said displaying step; and
a second creating step of executing a process which creates a plurality of record images continuously representing a scene belonging to the second area based on the output of said imager in response to a second recording operation which is accepted in parallel with the process of said displaying step.

* * * * *